(12) United States Patent
Head et al.

(10) Patent No.: US 6,395,210 B1
(45) Date of Patent: May 28, 2002

(54) PULTRUSION METHOD AND DEVICE FOR FORMING COMPOSITES USING PRE-CONSOLIDATED BRAIDS

(75) Inventors: Andrew A. Head; Donald Lambert, both of Cincinnati; John Peter, Loveland, all of OH (US)

(73) Assignee: A&P Technology, Inc., Covington, KY (US)

(*) Notice: Subject to any disclaimer, the term of this patent is extended or adjusted under 35 U.S.C. 154(b) by 0 days.

(21) Appl. No.: 09/310,514

(22) Filed: May 12, 1999

(51) Int. Cl.[7] .............................................. B29C 47/02
(52) U.S. Cl. .................. 264/137; 264/171.26; 264/257; 264/273; 264/323
(58) Field of Search .............................. 264/137, 209.3, 264/171.76, 212, 257, 273; 156/148, 180, 443, 441

(56) References Cited

U.S. PATENT DOCUMENTS

| | | | |
|---|---|---|---|
| 3,772,118 A | 11/1973 | Walter | 156/172 |
| 3,790,651 A | 2/1974 | Meitinger | 264/135 |
| 3,936,285 A | 2/1976 | Maaghul | 65/3 C |
| 3,975,479 A | 8/1976 | McClean | 264/102 |
| 3,981,649 A | 9/1976 | Shimano et al. | 425/4 C |
| 3,997,306 A | 12/1976 | Hedden | 65/3 C |
| 4,029,623 A | 6/1977 | Magghul | 260/29.6 RW |
| 4,038,243 A | 7/1977 | Maaghul | 260/40 R |
| 4,042,436 A | 8/1977 | Sundberg et al. | 156/182 |
| 4,046,103 A | 9/1977 | Yakuboff | 118/125 |
| 4,048,398 A | 9/1977 | Sundberg | 429/140 |
| 4,049,865 A | 9/1977 | Maaghul | 428/391 |
| 4,081,575 A | 3/1978 | Spirig | 427/327 |
| 4,137,119 A | 1/1979 | Piola | 156/431 |
| 4,305,742 A | 12/1981 | Barch et al. | 65/3.43 |
| 4,341,822 A | 7/1982 | Singer et al. | 427/389.9 |
| 4,347,287 A | 8/1982 | Lewis et al. | 428/378 |
| 4,494,436 A | 1/1985 | Kruesi | 87/23 |
| 4,685,873 A | * 8/1987 | Willard et al. | 264/83 |
| 4,701,345 A | 10/1987 | Giatras et al. | 427/45.1 |
| 4,713,319 A | 12/1987 | Aono et al. | 430/567 |
| 4,728,473 A | 3/1988 | Satoh et al. | 264/101 |
| 4,816,309 A | 3/1989 | Hutt et al. | 428/34.5 |
| 4,859,380 A | 8/1989 | Ogata | 264/25 |
| 4,869,863 A | 9/1989 | Iwai et al. | 264/564 |
| 4,883,552 A | 11/1989 | O'Connor et al. | 156/180 |
| 4,891,179 A | 1/1990 | Peacock et al. | 264/565 |
| 4,892,764 A | 1/1990 | Drain et al. | 428/34.5 |

(List continued on next page.)

Primary Examiner—Jan H. Silbaugh
Assistant Examiner—Edmund H. Lee
(74) Attorney, Agent, or Firm—Darby & Darby

(57) ABSTRACT

A method and device for forming composites using a pre-consolidated tubular braid (i.e., a braid removed from the braiding machine on which it was produced prior to use in further processing) including feeding the pre-consolidated tubular braid over a supporting mandrel, impregnating the braid with a resin using a pressurized resin injection chamber with a mandrel adapted to provide adequate impregnation, feeding the resin saturated braid into a pultrusion die with a mandrel for forming and heating and pulling the cured composite from the die for finishing the end product.

6 Claims, 14 Drawing Sheets

U.S. PATENT DOCUMENTS

| | | | |
|---|---|---|---|
| 4,978,360 A | 12/1990 | Devanathan | 623/66 |
| 4,983,240 A | 1/1991 | Orkin et al. | 156/148 |
| 5,098,493 A | 3/1992 | Taylor | 156/87 |
| 5,098,496 A | 3/1992 | Breitigam et al. | 156/180 |
| 5,120,380 A | 6/1992 | Strachan | 156/164 |
| 5,139,593 A | 8/1992 | Loubineux et al. | 156/73.2 |
| 5,139,710 A | 8/1992 | Smith | 264/22 |
| 5,176,865 A | 1/1993 | Beall et al. | 264/174 |
| 5,225,020 A | 7/1993 | Millett et al. | 156/180 |
| 5,296,064 A | 3/1994 | Muzzy et al. | 156/180 |
| 5,324,377 A | 6/1994 | Davies | 156/180 |
| 5,395,477 A | 3/1995 | Sandusky | 156/441 |
| 5,407,616 A | 4/1995 | Dube | 264/40.1 |
| 5,409,651 A | 4/1995 | Head | 264/103 |
| 5,439,215 A * | 8/1995 | Ratchford | 273/67 A |
| 5,470,517 A | 11/1995 | Conley | 264/137 |
| 5,501,248 A | 3/1996 | Kiest, Jr. | 138/98 |
| 5,514,417 A | 5/1996 | Matthews et al. | 427/358 |
| 5,539,012 A | 7/1996 | Klemarczyk et al. | 522/13 |
| 5,540,870 A | 7/1996 | Quigley | 264/103 |
| 5,556,496 A | 9/1996 | Sumerak | 156/166 |
| 5,565,449 A | 10/1996 | Klemarczyk et al. | 522/13 |
| 5,580,626 A | 12/1996 | Quigley et al. | 428/36.2 |
| 5,585,414 A | 12/1996 | Klemarczyk et al. | 522/13 |
| 5,639,307 A | 6/1997 | Bellemare | 118/420 |
| 5,665,451 A | 9/1997 | Dorn et al. | 428/116 |
| 5,679,719 A | 10/1997 | Klemarczyk et al. | 522/13 |
| 5,716,487 A | 2/1998 | Sumerak | 156/359 |
| 5,747,075 A | 5/1998 | Gauchel et al. | 425/114 |
| 5,759,323 A | 6/1998 | Van Hoey et al. | 156/149 |
| 5,783,013 A | 7/1998 | Beckman et al. | 156/180 |

* cited by examiner

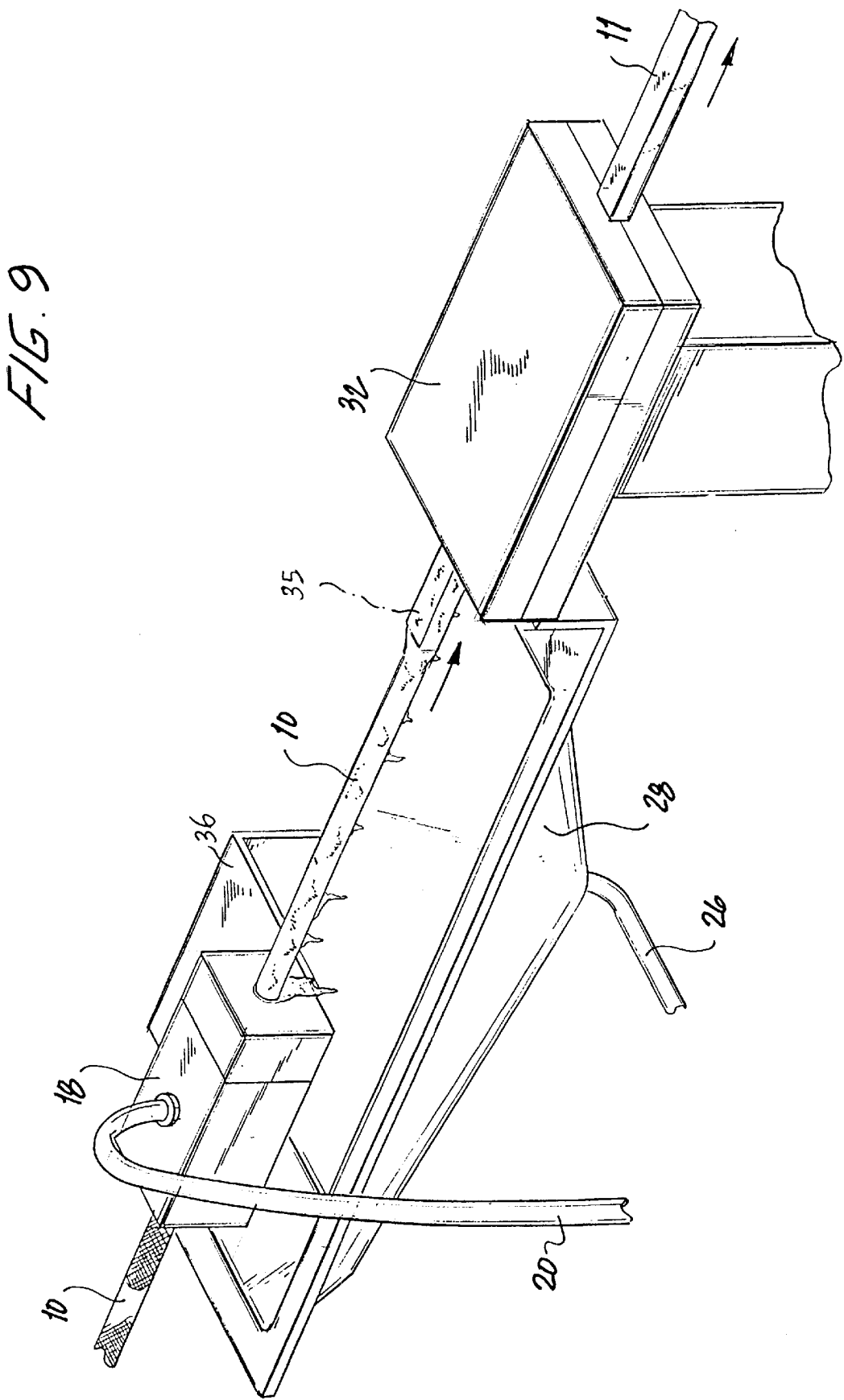

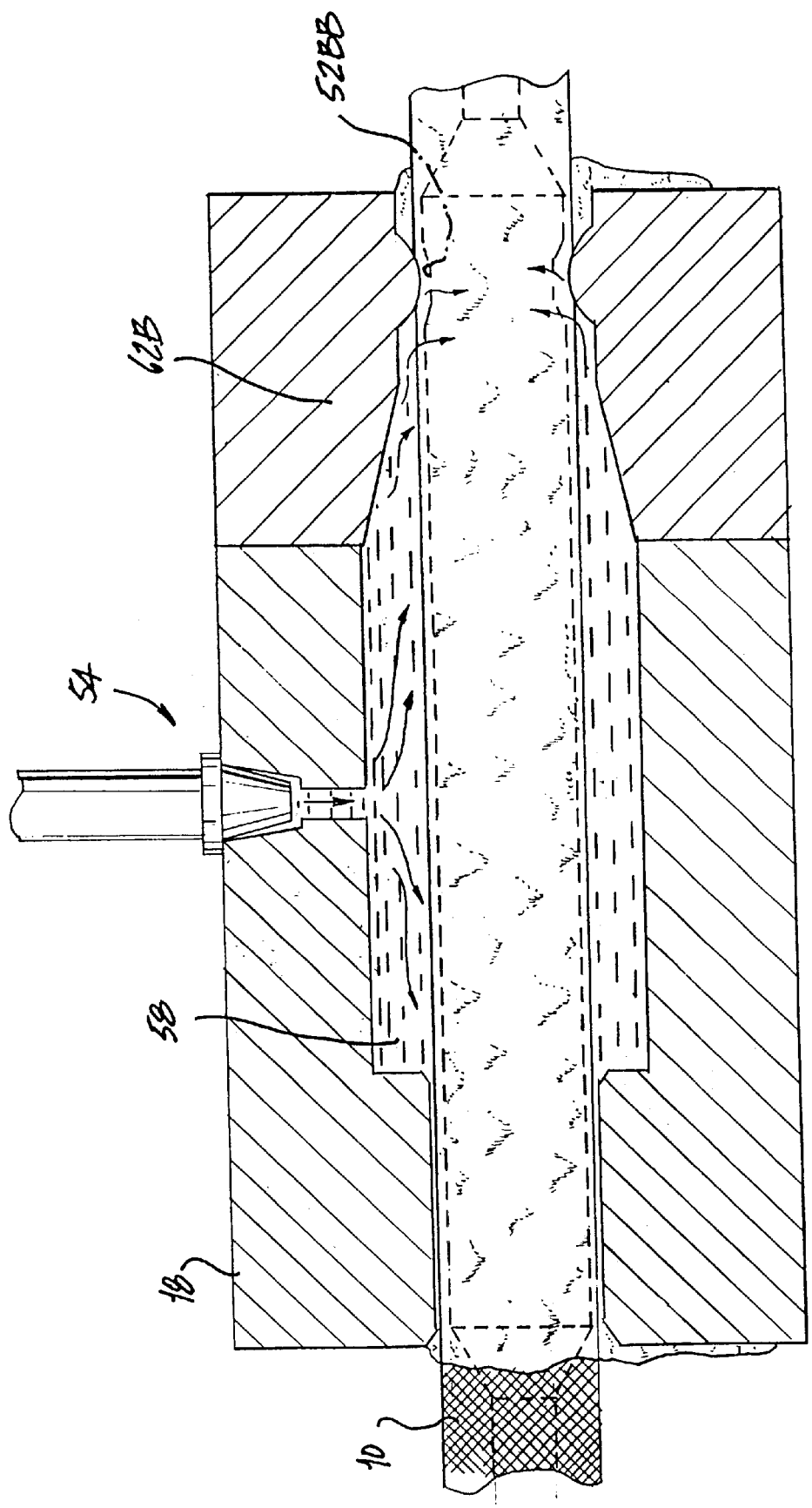

PULTRUSION METHOD AND DEVICE FOR FORMING COMPOSITES USING PRE-CONSOLIDATED BRAIDS

FIELD OF THE INVENTION

This invention relates generally to pultruding braids to form composites.

BACKGROUND OF THE INVENTION

Pultrusion is a fabrication method that is often used for producing elongated rigid tubular structures. Generally, pultrusion is defined as a process for producing reinforced composites by pulling a resin impregnated fiber substrate through a forming and curing die. Pultrusion has its origins in the early 1950s when it was used to form the pole sections for fishing rods. The methods and machinery for forming pultruded parts remained the same until the late 1960s when improvements allowed manufacturers to form various structural shapes used to produce ladders, handrails, walkway supports and the like. Pultrusion is used today to produce hollow and solid reinforced composites of various dimensions.

One known form of pultrusion utilizes tubular braids made by a braiding machine as part of the processing line to form tubular composites. It includes mounting a braiding machine at the beginning of the pultrusion process to produce the braid. Individual axial fibers are passed through a matrix resin and are fed through the braiding machine where they meet bias fibers and are braided to form a braid. The braid is then pulled from the braiding machine to a pultrusion die where it is heated and formed in order to produce a rigid composite. In other processes having a braiding machine on the processing line, the braid is formed on the braiding machine and is then fed through a resin injection component (e.g., a bath) followed by a pultrusion component. Braiders which are incorporated in pultrusion processes are referred to as in-line braiding machines. Such in-line braiding machines are shown in U.S. Pat. No. 5,468,327 to Pawlowicz et al. (hereinafter, the '327 patent), the contents of which are incorporated herein by reference. However, there are several disadvantages with using in-line braiding machines in conjunction with pultrusion. One disadvantage is that in-line braiders are typically small machines (e.g., with 144 or fewer carriers) due to the physical difficulties of side-mounting large machines as well as the added cost of building and maintaining large, side-mounted braiders. As a result, in-line braiding can limit the size (i.e., diameter) of the braiding machine which can be used in a pultrusion process. Consequently, the braid is similarly limited in diameter.

Another disadvantage is that producing braided substrates using an in-line braiding machine limits the process to the speed of braiding considerations in addition to pultrusion considerations. The braiding machine speed is based on many factors: yarn spool size dictates the need to stop and start the machine in order to splice in new pieces; and, splicing takes manual intervention, which ultimately stops the pultrusion process using an in-line braiding machine. In addition, there are also numerous quality checks that need to be made prior to braid progressing to the pultrusion process. Braid needs to be checked for imperfections and inconsistencies before consideration for downstream processing. These factors make in-line braiding machines slower than the pultrusion process.

Accordingly, the manufacture of braid is optimally separated from downstream processing, such as pultrusion. For example, a braid can be manufactured on a braiding machine and subsequently wrapped around a storage reel for later use in a pultrusion process. Braids removed from the braiding machine on which they were produced prior to use in further processing are hereinafter referred to as pre-consolidated braids. In addition, pre-consolidated braids have further advantages over in-line braids for use in pultrusion. Pre-consolidated braids offer flexibility in braid choice for a single pultrusion set-up. For example, a one inch diameter braid can be made by 15 different sizes of braiding machines, each of which yield a different wall thickness, fiber angle and raw material. Each of these braid styles can be accommodated by one mandrel in the pultrusion process. Yarn choice is also expanded with pre-consolidated braid because the conditions for braiding some materials (e.g., braiding in a dust free environment etc.) are better met outside of the pultrusion process.

Another known form of pultrusion utilizes flat substrates, including a flat braid or a flat non-braided material with fibers oriented therein, to form tubular composites. The flat braided substrates generally are pre-consolidated. The pultrusion process includes passing the substrate through a matrix resin bath. The wetted substrate is then pulled through a die having a mandrel located in the center of the die for forming purposes. Upon entry into the die, the substrate must pass a bolted fixture that holds the mandrel in place. A bolted fixture is needed in order to keep the mandrel stationery and concentric. Such mandrel orientation is desired to provide an even coating of resin around the braid. After passing the bolted fixture, the flat substrate is wrapped around the mandrel so that its ends (along its longitudinal axis) are connected to form a shape inside the die. One exemplary shape is a hollow tube. The formed substrate is heated to produce a rigid composite structure having a predetermined shape. However, the use of tubular braids for forming tubular composites has advantages compared to wrapped flat substrates. Tubular braids have continuous interlocking fibers which have uniform material distribution, no overlapping material and improved hoop strength (also known as transverse strength) when converted into a composite.

Therefore, there is a need for pultruding pre-consolidated tubular braids. However, there are barriers to pultruding such braids because the pultrusion components used for in-line braids or pre-consolidated flat braids are not conducive for use with pre-consolidated tubular braids. Such known components are pultrusion dies, mandrels and resin injection devices. One barrier is that the braid must be supported by a mandrel along the processing line. For in-line braids, the mandrel which forms part of the braiding machine supports the braid. For example, in the '327 patent, an in-line braiding machine (FIG. 1) is shown. The mandrel which forms part of the in-line braiding machine supports the braid throughout the subsequent process. The mandrel is supported as a cantilever upstream of the machine by a beam, which is supported by the base. Therefore, the beam supports the mandrel.

Where pre-consolidated flat braids are used, the mandrel is held in place using one or more bolted fixtures. A flat braid is then drawn over the bolts and thereafter wrapped (along its longitudinal axis) to form a tubular shape for curing, as described above. However, the bolts holding the mandrel in place would prevent pre-consolidated tubular braids from advancing over the mandrel. For example, in the '327 patent, a pre-consolidated tubular braid would be prevented from being pulled over the mandrel due to the beam.

Another barrier to using pre-consolidated tubular braids is that the mandrel should have a concentric orientation to the extent possible in the resin injection chamber and pultrusion die. Such concentric orientation is desired in order to provide an even coating of resin around the braid and to minimize the load requirements for pulling the braid through the pultrusion process. Otherwise, the wall thickness of the cured braid will be uneven. This, in turn, reduces the strength of the composite. Where the braid is in-line, the mandrel is supported as part of the braiding machine. Where the braid is a pre-consolidated flat substrate, support can be provided by bolting the mandrel to the processing line. However, such bolting is not possible with pre-consolidated tubular braids. Therefore, if the bolts are removed, there is no support for maintaining a concentric orientation or for holding the mandrel in place. Therefore, known mandrels do not support pre-consolidated tubular braids in pultrusion.

A further barrier to using pre-consolidated tubular braids is that composite materials formed with pultrusion require a thorough impregnation of the fiber substrate in order to deliver optimal composite performance. Resin baths are often used in pultrusion in order to mingle the matrix resin with the fibers of braids or flat surfaces of the substrates. These resin baths, however, do not adequately force the matrix resin through the fibers, and therefore are not adequate for pre-consolidated tubular braids since the tubular shape of braid guards its interior. Also, the flat surface of most mandrels prevents resin from thoroughly impregnating the braid. Pressurized resin chambers are also available. However, they wet-out only sections of braid and are not built to handle the continuous nature of pre-consolidated tubular braid. For example, in U.S. Pat. No. 5,407,616 to Dube, there is shown a resin injection chamber for impregnating a braid with resin. However, the braid and mandrel in combination are moved through the chamber. Therefore, the length of the braid is limited to the length of the mandrel. In addition, the process is not continuous because a single braid/mandrel combination is processed at a time. This patent is incorporated in its entirety herein by reference.

In summary, there is a need for pultrusion process components which enable the use of pre-consolidated tubular braids to form tubular composites. However, known pultrusion processes do not adequately provide a mandrel which supports pre-consolidated tubular braids and is maintained in a concentric orientation nor provide a resin injection component which thoroughly impregnates pre-consolidated tubular braids.

SUMMARY OF THE INVENTION

It is an objective of our present invention to provide a new pultrusion method and device for forming tubular composites utilizing pre-consolidated tubular braids alone or with additional materials such as fibers, fabrics, mats, tapes or other similar materials. It is another objective of our present invention to adequately impregnate matrix resin into pre-consolidated tubular braids.

One embodiment of our invention is directed to providing a mandrel which supports pre-consolidated tubular braids and is maintained in a concentric orientation in the resin injection chamber and pultrusion die. The supportive mandrel can include a "S" shape section over which a pre-consolidated tubular braid is pulled. The "S" shaped mandrel is oriented within roller drives to support the mandrel and assist in moving the braid. The mandrel can also include centering components, in the form of turnbuckles, before or after the resin injection chamber or pultrusion die. The mandrel is maintained in a concentric orientation with the resin injection chamber and pultrusion die by the support given to it from the roller drives in the S shape section as well as the centering components. The S shape section holds the mandrel in place along its longitudinal axis in response to the forces due to movement of the braid over it. In addition, the tension placed on the braid as it is pulled through the process causes it to seek the center of the chamber and die. The centering components enable the mandrel to move along the mandrel's radial axes just before the chamber or die in order to support the braid's radial movement toward the center. Consequently, the concentric orientation of the mandrel inside the chamber and die is optimized.

A second embodiment of our invention is directed to providing a pressurized resin injection chamber with a mandrel which provides adequate impregnation of pre-consolidated tubular braids. The pressurized resin injection chamber includes a portion of the mandrel with depressions on its surface, for example, down its length or forming a helical winding down its length etc., such that resin flows through the surface of the pre-consolidated tubular braid, past the braid fibers located on the braid's interior and into the depressions. Then, the resin can flow within the depressions along the length of the mandrel and exit the braid by contacting the braid fibers located in the braid's interior and then flowing through the braid to its surface.

Our invention provides the advantage that pre-consolidated tubular braids can now be adequately pultruded. In addition, pre-consolidated tubular braids which are pultruded in order to produce a composite have the following advantages compared to in-line braids: the size of the braid (as determined by the size of the braiding machine) is not limited to small machines (e.g., typically with 144 on fewer carriers) and the speed of the pultrusion process is not limited to the speed of the braiding machine. In addition, pre-consolidated tubular braids have numerous advantages compared to a wrapped flat pre-consolidated braids or flat non-braided substrates (as are used in known pultrusion processes). Pre-consolidated tubular braids have continuous interlocking fibers which have uniform material distribution, no overlapping material and improved hoop strength when converted into a composite. In addition, since the concentric orientation of the mandrel is optimized, the cured braid's walls are evenly coated with resin. Moreover, the pre-consolidated braid is adequately wetted-out to provide more intermingling between the braid and matrix resin, which ultimately provides better strength properties in the end product composite.

These and other objects and advantages of the present invention will become more readily apparent during the following detailed description, taken in conjunction with the drawings herein, in which:

DESCRIPTION OF THE DRAWINGS

FIG. 1A is a top elevation sectional view along line 1A—1A of FIG. 1;

FIG. 9 is a perspective of a pultrusion die of FIG. 1 with a shaping mandrel;

FIG. 11B is a side elevation sectional view of a resin injection chamber with a second alternative embodiment of the geometry of the chamber reservoir;

DETAILED DESCRIPTION OF THE INVENTION

Figure 1:
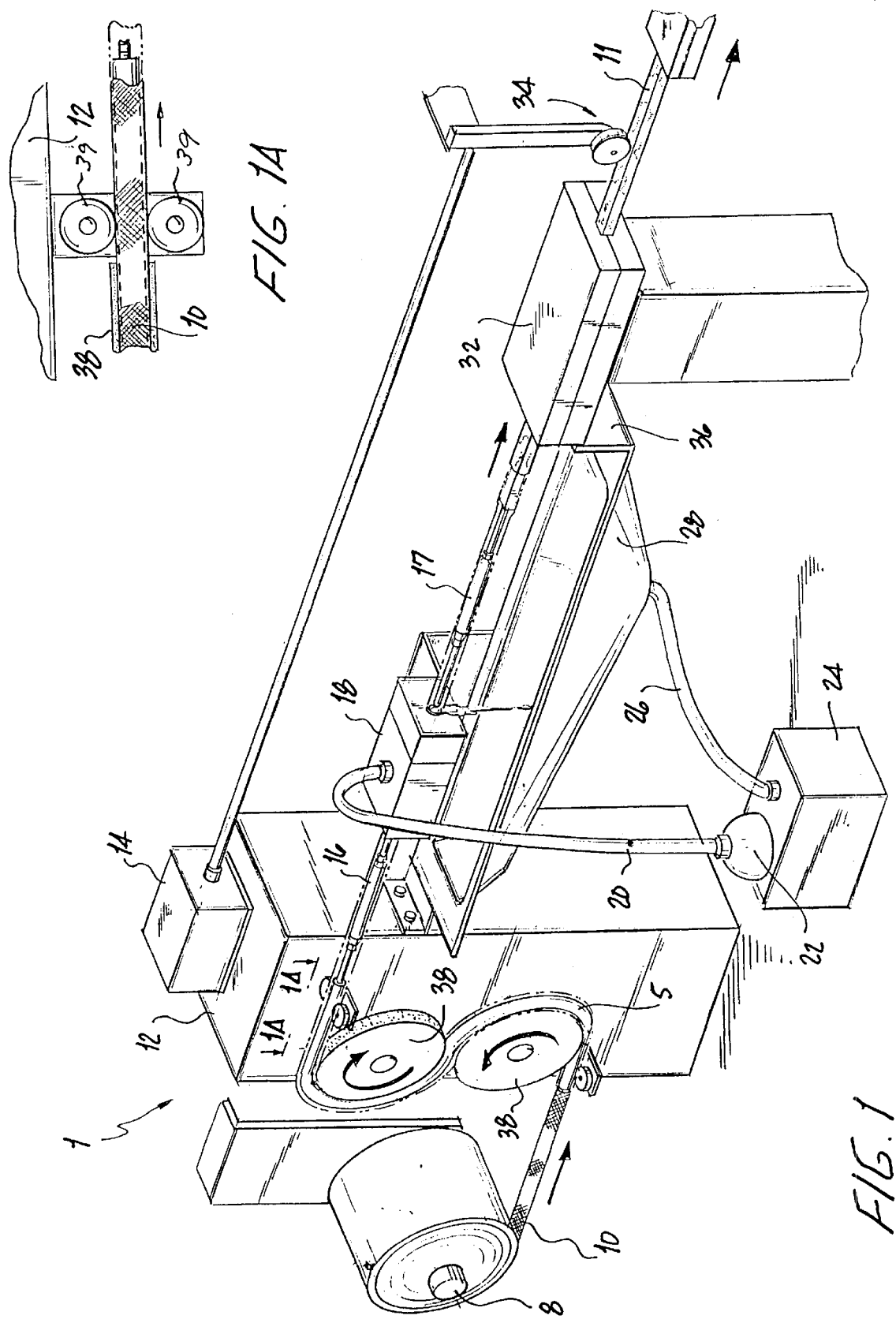
FIG. 1 is a perspective view of the pultrusion process according to an embodiment of the present invention.

FIG. 1 is a perspective view of the pultrusion process 1 according to an embodiment of the present invention. The pultrusion process 1 includes the following primary components: a mandrel 5, a pre-consolidated tubular braid 10, a roller drive assembly 12, turnbuckles 16 and 17, a resin injection chamber 18 and a pultrusion die 32. Generally, the braid 10 is pulled over the mandrel 5 such that the braid 10 encompasses the mandrel 5. The mandrel 5 is supported by the roller drive assembly 12 by partially encircling the assembly 12 in a S shape. In addition, the assembly 12 assists in moving the braid 10 along the pultrusion process 1 by pulling the braid off a reel 8. The braid 10 is also pulled by a hydraulic-puller or other pulling mechanism at the end of the pultrusion process 1 (not shown). The control box encoder 34 determines the speed of the braid 10 at the end of the pultrusion process 1. That information is fed back to the speed control box 14 so that the speed of the braid as it passes over the S shaped mandrel 5 can be adjusted accordingly.

The braid 10 moves from the assembly 12 along the mandrel 5 to the turnbuckle 16. The turnbuckles 16 and 17 enable movement of the mandrel 5 in order to optimize the concentric orientation of the mandrel 5 in the resin injection chamber 18 and the pultrusion die 32. While in the chamber 18, the braid 10 is impregnated with matrix resin based on the design of the mandrel 5 within the chamber 18. After moving over the turnbuckle 17, the braid 10 moves into the pultrusion die 32. The braid 10 is heated and formed in the pultrusion die 32. The braid 10 which emerges from the pultrusion die 32 is a composite 11. The composite can be further processed (not shown) to provide an end product. Such further processing can include, for example, cutting the composite at predetermined lengths.

Figure 2:
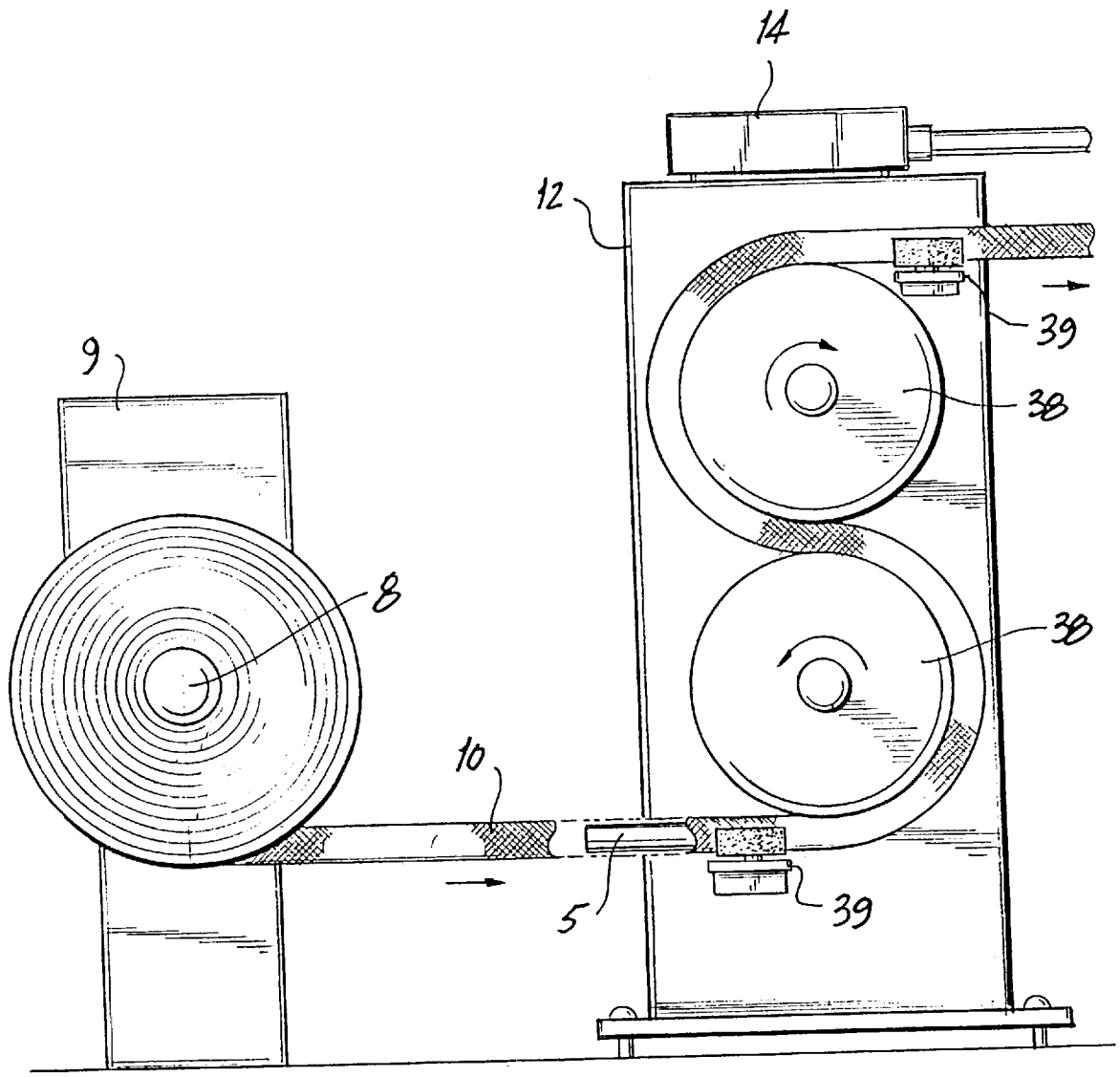
FIG. 2 is a front view of the roller drive assembly of FIG. 1, with a braid cutaway to reveal a mandrel.

The pultrusion process 1 is now further described with reference to FIG. 1 in combination with the remaining figures. Referring to FIGS. 1, 1A and 2, the reel 8 and roller drive assembly 12 are shown; FIG. 1A is an elevation of the assembly 12 along line 1A—1A shown in FIG. 1 and FIG. 2 is a front view of the assembly 12 with a braid 10 cutaway to reveal the mandrel 5. The pre-consolidated tubular braid 10 is pre-wound on a reel 8. The reel 8 is supported by reel brace 9. The pre-consolidated tubular braid 10 can be any type of braid, such as, for example, biaxial or triaxial braids. In addition, the braid 10 can be formed from any composition of yarn, including, for example, carbon or fiber-glass yarns. The yarn can be of any thickness and density, including, for example, 12k carbon or 450 denier glass. The braid 10 is pulled onto the mandrel 5. The mandrel can be formed from any material with load bearing capabilities, such as, for example, A1 or O1 tool steel, as is conventional in the braiding industry.

The roller drive assembly 12 supports the mandrel 5, which is wound around the roller drive wheels 38 in a S shape, and pulls the braid 10 from the reel 8 by virtue of the roller drive wheels 38, thereby making the process continuous. The roller drive assembly 12 includes the following components: roller drive wheels 38, roller guide wheels 39 and the speed control box 14. These reel 8 and assembly 12 components enable the braid 10 to be pulled from the reel 8 to encase the S shaped mandrel and follow the path of the S shape mandrel through the drive wheels 38. The roller guide wheels 39 (shown in FIGS. 1A and 2) further support the mandrel 5 by preventing it from falling off the drive wheels 38 and keeping the braid 10 in place. The guide wheels 39 are connected to the assembly 12, In alternative embodiments, the braid 10 need not be driven by the driver wheels 38 and pulled by a hydraulic puller or other pulling mechanism. Rather, movement of the braid 10 can be provided by either driving or pulling the braid 10. The scope of our invention is not limited by the mechanism(s) by which the braid 10 is moved along the process 1.

The speed of the braid 10 pulled off the reel 8 by the assembly 12 is regulated by the speed control box 14 (shown in FIGS. 1 and 2). The box 14 receives the speed of the braid 10 at the end of the pultrusion process 1 from the control box encoder 34. The box 14 regulates the speed of the wheels 38 in order to maintain a speed of the braid 10 as it passes over the S shaped mandrel 5 which matches, to the extent possible, the speed of the braid 10 at the end of the pultrusion process 1. A speed which matches the pultrusion line speed helps prevent bunching or binding of the tubular braid as it passes over the mandrel. Braid 10 speed can be monitored anywhere along the pultrusion process 1. Preferably, such monitoring is done at the end of the processing line, e.g., by encoder 34. An exemplary speed for the pultrusion process 1 is 12 to 48 inches per minute.

In alternative embodiments according to the present invention, instead of monitoring the braid 10 speed, the braid 10 tension can be monitored. For example, tension can be checked using a tension monitoring device (not shown) as the braid enters the pressurized resin injection chamber 18.

Braid speed can be adjusted via the speed control box 14 based on the amount of braid tension.

In further alternative embodiments, the braid 10 speed need not be maintained at a constant rate. Rather, the speed of the braid 10 along the processing line can be varied or the braid 10 can be stopped, such that the process is not continuous. While, preferably, a constant speed is maintained, a pultrusion process 1 without a constant speed is contemplated as within the scope of our invention.

Figure 3:
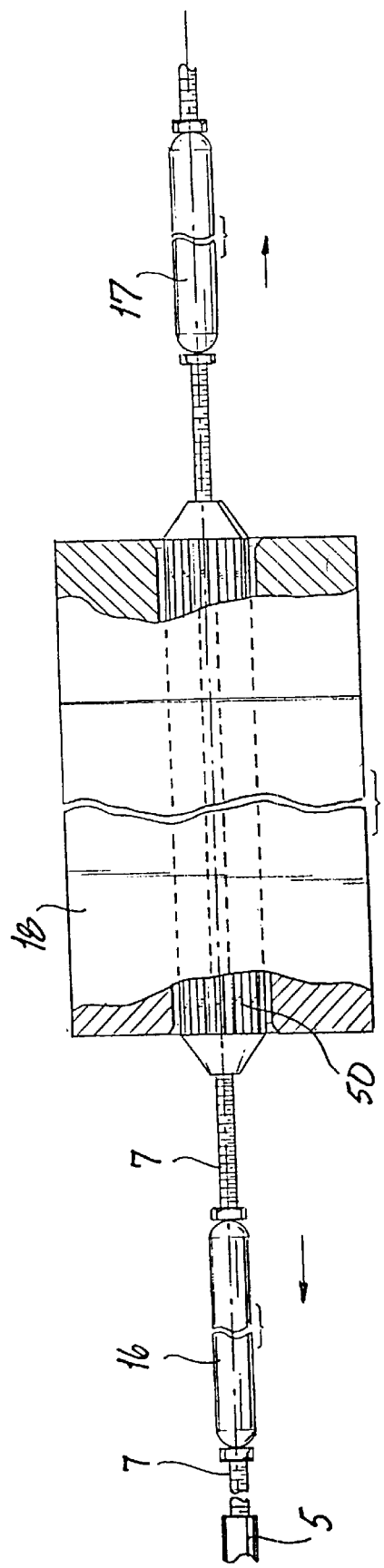
FIG. 3 is a side elevation of a resin injection chamber, with a cutaway of the resin injection chamber to reveal a portion of a mandrel inside the chamber, and turnbuckles of FIG. 1.

Referring to FIGS. 1 and 3, the function of the turnbuckles is further described. FIG. 3 is a side elevation of the mandrel 5 and the resin injection chamber 18 with fragmented cut-away views to show the mandrel 5 portion 50 inside of the chamber 18. Based on the tension placed on the braid 10 as a result of the pulling component (not shown), the braid 10 seeks the shortest distance between the assembly 12 and the pulling component. The shortest distance is the center of each component, e.g., the chamber 18 and the die 32, in the process 1. At the same time, the braid 10 tension results in a substantial load applied to the mandrel 5. We have found that the load on mandrel 5 can pull it off center, thereby also pulling the braid off center. The turnbuckle 16 enables movement of the mandrel 5 along the mandrel's radial axes in order to optimize the concentric orientation of the mandrel 50 in the resin injection chamber 18. Turnbuckle 16 is secured to the mandrel 5 via threaded rods 7. A second turnbuckle 17 can be located at the exit of the resin injection chamber 18. The turnbuckle 17 functions in the same manner of the turnbuckle 16 in order to add flexibility to the movement of the braid 10 through the chamber 18. The concentric orientation of the mandrel 50 and therefore the braid 10 inside the chamber 18 is important because the resin is applied such that it results in uniform wall thickness, improved surface finish and uniform resin/fiber content of the braid 10. In addition, turnbuckle 17 can support a concentric orientation of the mandrel inside the die 32 as well.

However, while preferably, turnbuckles 16 and 17 are included on either side of the chamber 18 in order to optimize the concentric orientation of the mandrel 5, the use of a single turnbuckle 16 or 17 is within the scope of our invention. Moreover, turnbuckles in addition to turnbuckles 16 and 17 are within the scope of our invention. In addition, a pultrusion process 1 without any turnbuckles is contemplated as within the scope of our invention. While a concentric orientation of mandrel 50 inside the chamber 18 optimizes an even coating of resin around the braid 10, in certain applications for the composite 11, the evenness of resin coating may not be a factor in a the quality of the composite or certain applications may require a concentration of resin. Moreover, depending on the types of braid and resin used, e.g., the type of yam and the viscosity of the resin, the drive assembly 12 can be sufficient to provide a concentric orientation for the mandrel without the use of one or more turnbuckles.

Figure 4:
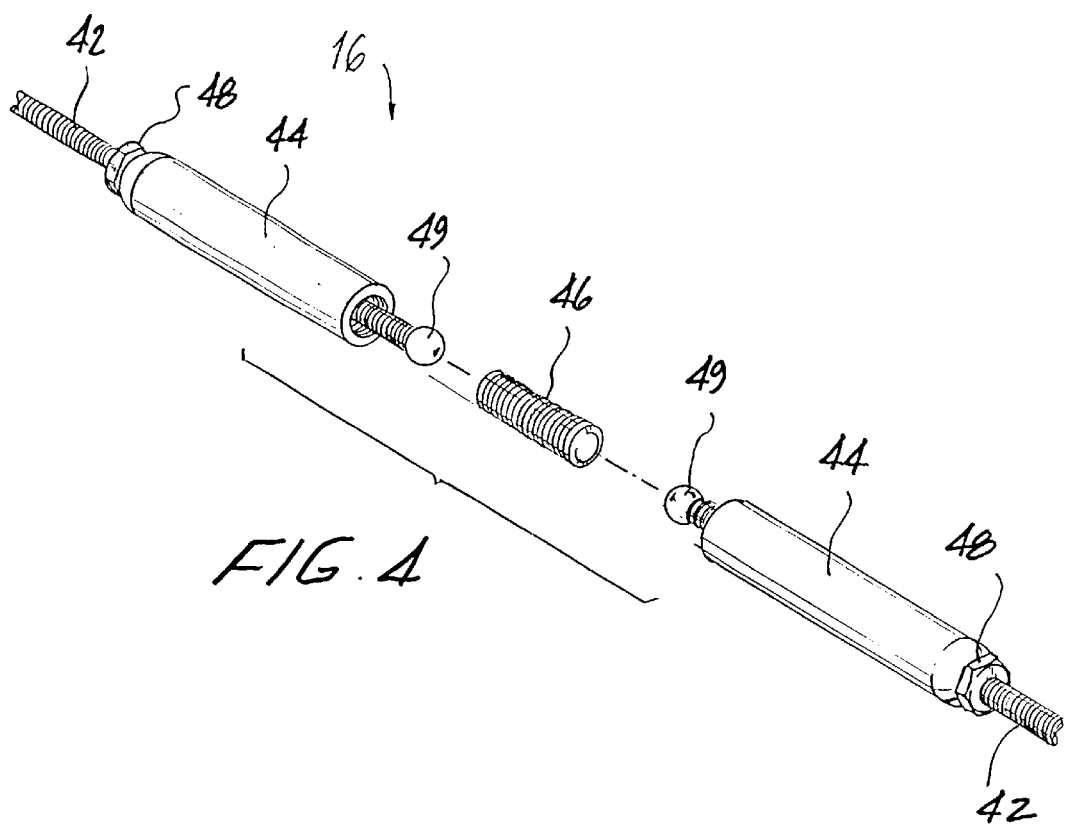
FIG. 4 is an exploded perspective of the FIG. 1 turnbuckle.
Figure 5:
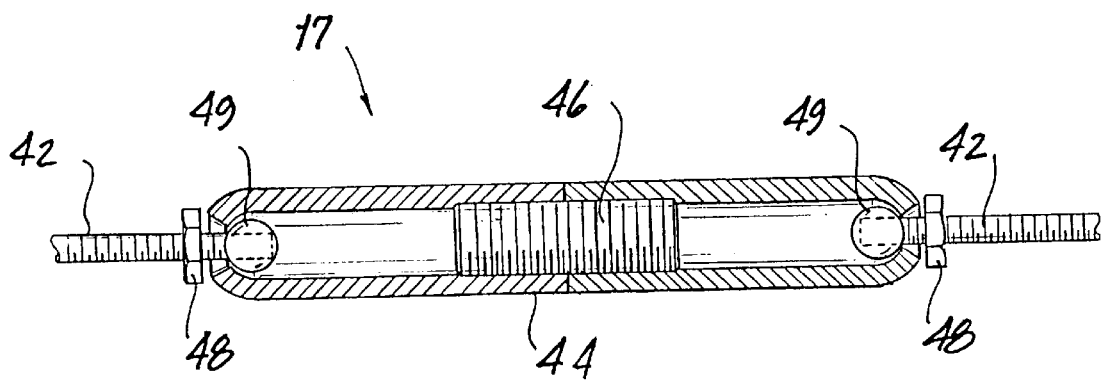
FIG. 5 is a side elevation sectional view of the FIG. 1 assembled turnbuckle.

FIGS. 4 and 5 further show the turnbuckles' 16 and 17 components; using turnbuckle 16 for illustration, FIG. 4 is an exploded perspective view and FIG. 5 is a side view. Steel balls 49 are placed at the end of the threaded rods 42 to allow angular and rotational movement of the turnbuckle 16. The turnbuckle housings 44 move along the threaded rod 7 but are constrained by the steel balls 49. The housings 44 are secured together by a threaded connector 46. The steel balls 49 are located at the ends of the housings' 44 interior and secured in that position by threaded rod nuts 48. FIG. 5 shows the tightened threaded rod nuts 48 and their final proximity to the steel balls 49. This assembled configuration allows the threaded rod 7 to move slightly within the turnbuckle housing 44 which ultimately allows for concentricity of the braid 10 as it travels over the mandrel 50 inside the chamber 18. The turnbuckles 16 and 17 can be formed from numerous materials such as, for example, 316 stainless steel or an equivalent. Such material is conventional in the braiding industry.

Figure 6:
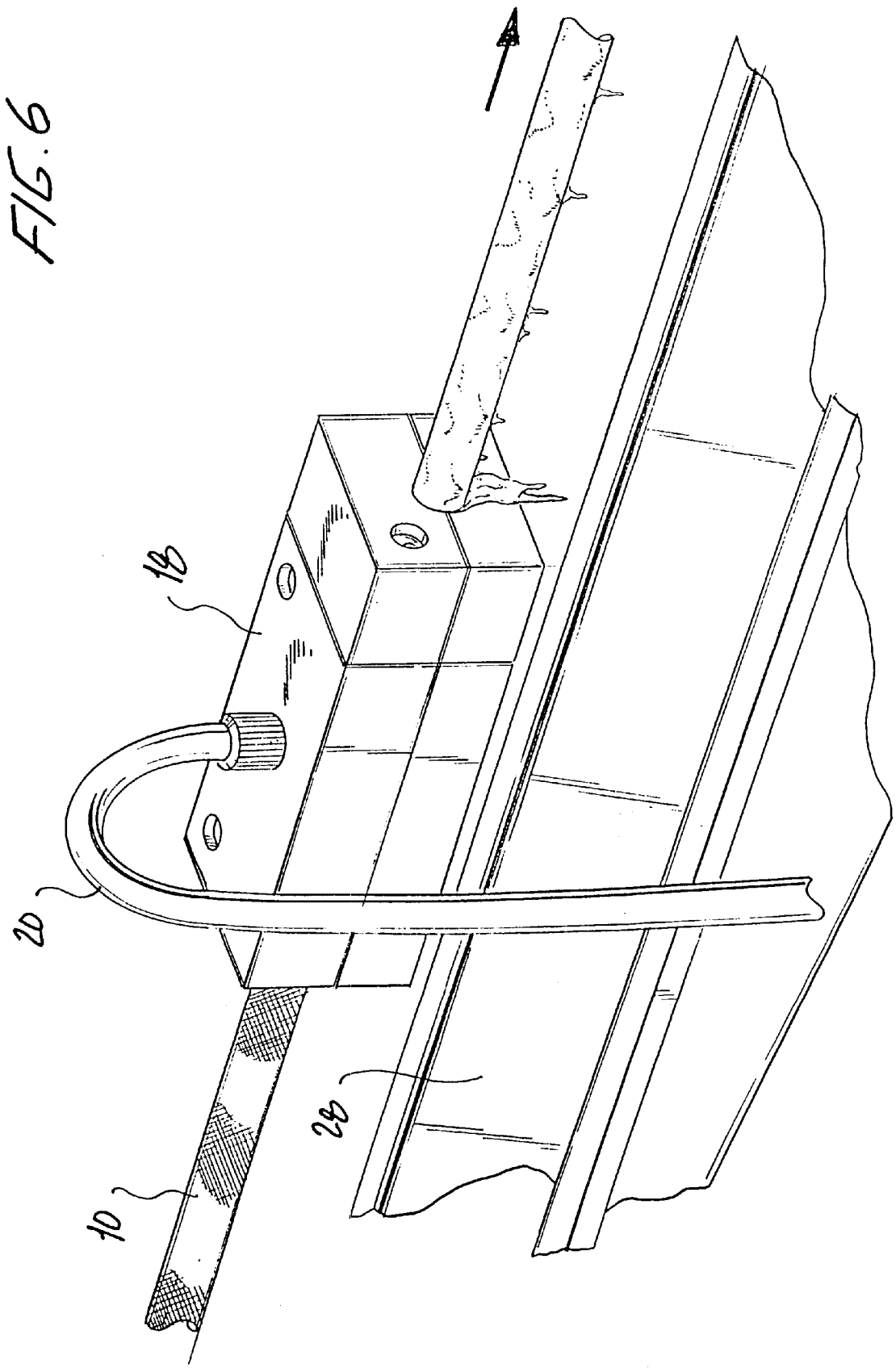
FIG. 6 is a perspective view of the resin injection chamber and a resin drip pan of FIG. 1.

Referring to FIGS. 1 and 6, the resin injection chamber is further described. FIG. 6 is a perspective view of the pressurized resin injection chamber 18 and resin drip pan 28. As the braid 10 enters the chamber 18, it does not contain resin. The chamber 18 receives resin via a source resin tube 20 under pressure. While the type of resin used does not limit the scope of our invention, an exemplary resin has the commercial name Hetron 922 (epoxy vinyl ester resin) and is available from Ashland Chemical Company/Division of Ashland Inc. (of Columbus, Ohio). In addition, while Hetron 922 need not be heated for use in the chamber, other types of resin can be heated. Where the resin is heated, a heating source is included in the chamber 18. Excess matrix resin that forms on the braid 10 and on the outside of the chamber 18 is collected in the resin drip pan 28. FIG. 1 shows the resin drip pan 28 working with additional components. This includes the resin return tube 26 that directs the excess resin into a resin reservoir 24 which serves a collection point. The resin is then circulated back to the pressurized resin injection chamber assembly via a resin pump 22 and the resin source tube 20. A steel support member 36 is used to hold both the resin drip pan 28 and the pressurized resin injection chamber assembly 18 in place.

Figure 7:
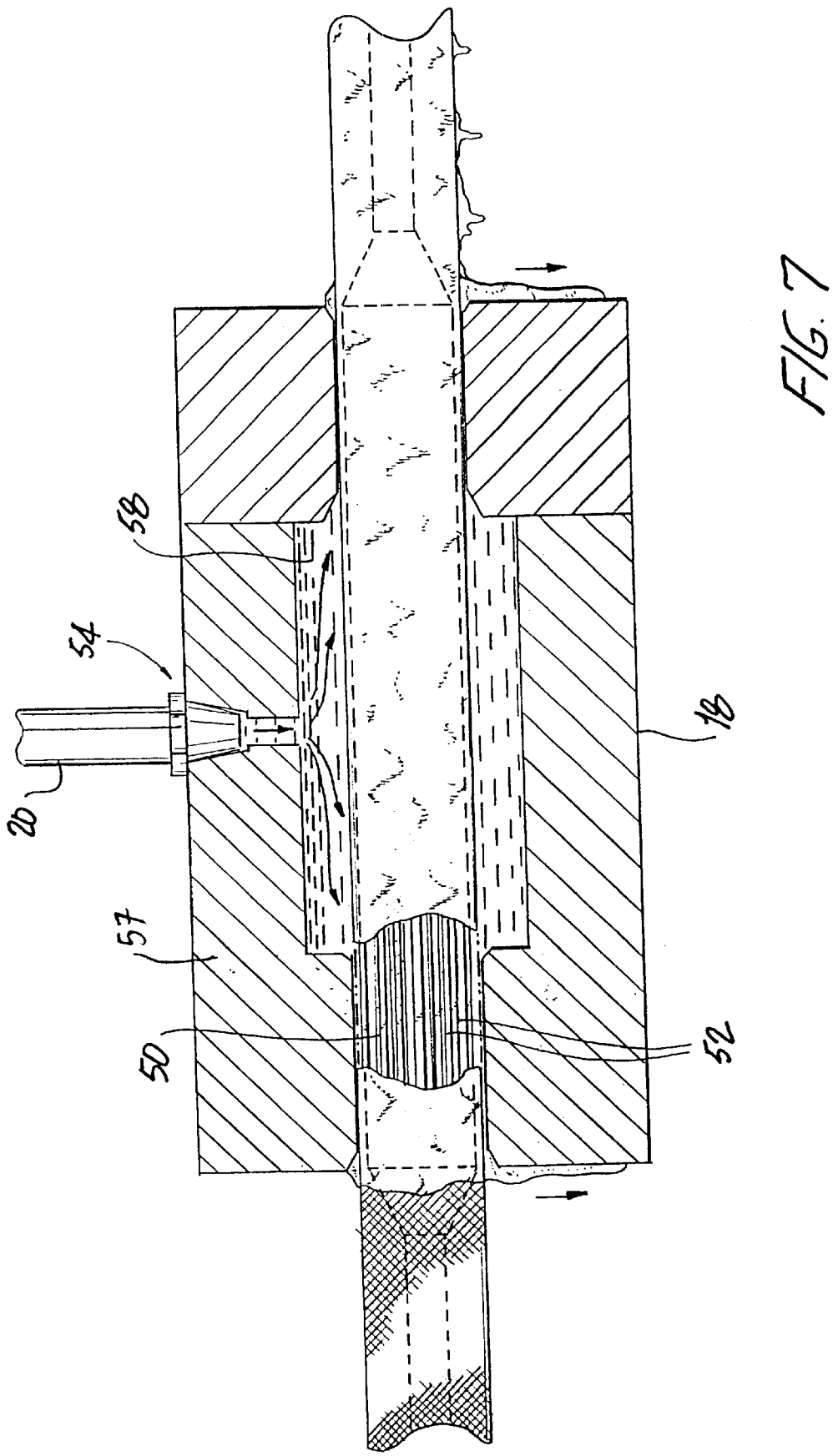
FIG. 7 is a side elevation sectional view of the resin injection chamber of FIG. 1, with a braid cutaway to show the portion of the mandrel inside the chamber.

FIG. 7 is a side elevation sectional view of the pressurized resin injection chamber 18 which includes a cut-away portion detailing the mandrel 50 inside the chamber 18. The chamber 18 includes a housing 57 and a reservoir 58 in the housing 57. The source resin tube 20 is held in place by a fitting 54 as the resin flows inside the reservoir 58. The mandrel 50 resides in the center of the reservoir 58. Generally, the mandrel 50 has depressions on its surface. For example, the mandrel 50 shown in FIG. 7 has flutes 52 or depressions 52 extending along the mandrel's longitudinal axis.

Figure 8:
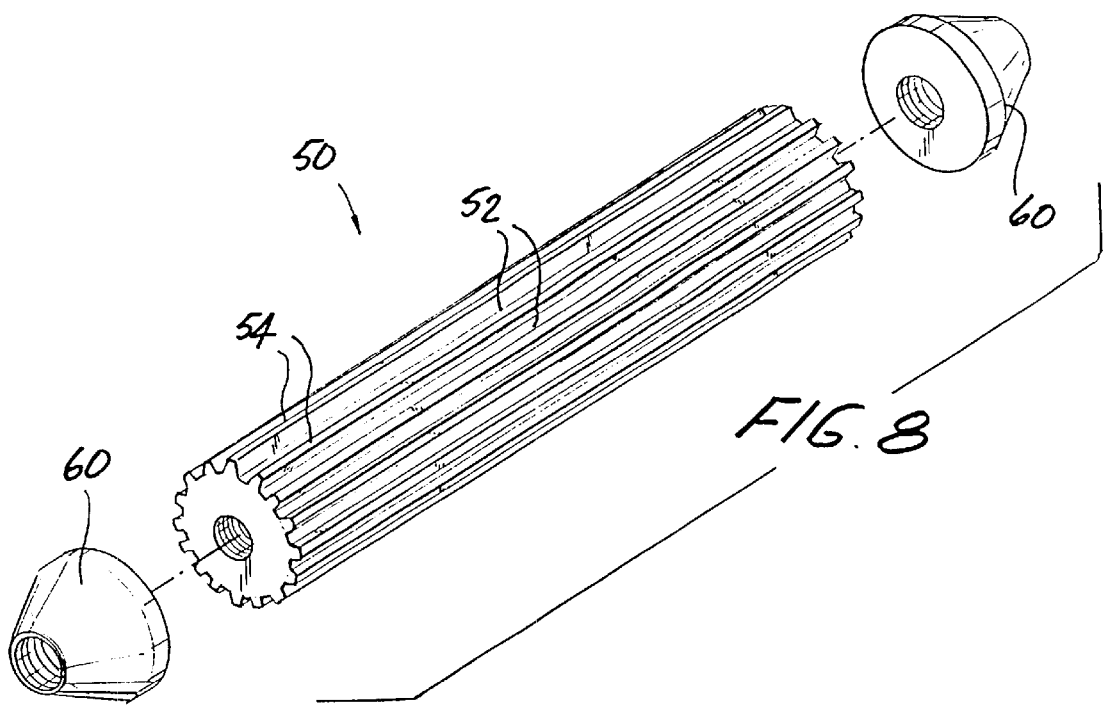
FIG. 8 is a perspective of the FIG. 1 mandrel with flutes.

FIG. 8 shows an exploded perspective view of the fluted mandrel 50 for the pressurized resin injection chamber 18. As the braid 10 (FIG. 1) passes over the mandrel 50 within the chamber reservoir 58 (FIG. 7), the pressurized resin entering the reservoir 58 flows through the braid's outer surface and into its interior within the flutes 52 of the mandrel 50 because the flutes 52 offer little resistance to the resin. The pressurized aspect of the chamber 18 then causes the resin to flow along the flutes 52 and from the interior of the braid 10 to the braid's outer surface. The resin circulation impregnates the braid 10 with resin. Dams 60 are added at each end of the mandrel to redirect the pressurized resin from flutes 52, through the braid's interior and to the braid's surface, rather than out the end of the mandrel 50. This forces the resin to again flow through the braid 10 and helps to further impregnate the braid 10 with resin. Also, the resin can be applied both to the outside of the braid so that it penetrates the braid's surface as well as to the depressions 52 so that it contacts the braid's interior.

In alternative embodiments of the chamber 18, the resin need not be pressurized or the chamber 18 can use a low pressurized resin flow (i.e., gravity resin flow). The pressurized aspect of the chamber 18 can be adjusted depending on the type of resin, the design of the mandrel 50 and/or the type of braid (e.g. yarn, thickness, density etc.) so that adequate resin impregnation can occur without the chamber being fully pressurized. In further alternative embodiments, the dams 60 need not limit the resin flow out the mandrel 50. Rather, resin can flow through the depressions 52 and out of the mandrel 50 into the resin pan 28 (FIG. 1). Once again, dams 60 need not be used depending on the type of resin and/or mandrel 50 design in order to adequately impregnate the braid 10.

The FIG. 8 mandrel 50 includes surfaces 54 (i.e., along its longitudinal axis) which are not depressed such that they act as a barrier to resin flowing into the braid's interior. However, as the braid 10 moves through the resin injection chamber 18, the natural oscillation of the braid 10 about the mandrel 50 can allow enough of the braid's interior to be located on top of the mandrel 50 depressions 52 so that the resin adequately impregnates the braid 10.

Figure 8A:
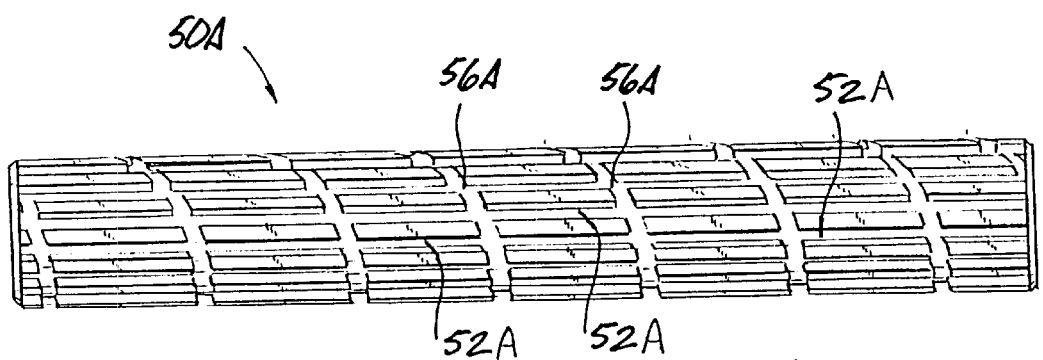
FIG. 8A is a side elevation of an alternate embodiment of the FIG. 8 mandrel with flutes and helices.
Figure 8B:
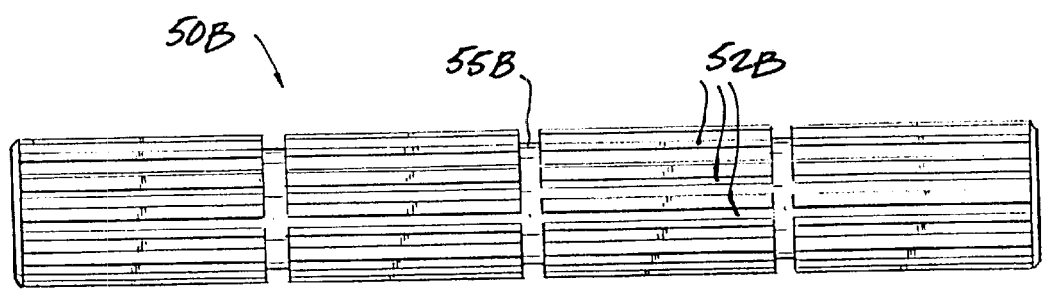
FIG. 8B is a side elevation of a second alternate embodiment of the FIG. 8 mandrel with flutes and rings.
Figure 8C:
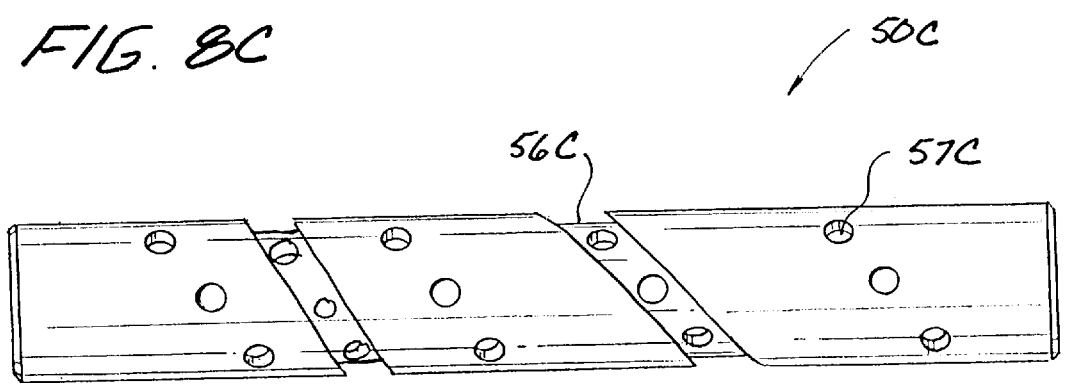
FIG. 8C is a side elevation of a third alternate embodiment of the FIG. 8 mandrel with holes and helices.
Figure 8D:
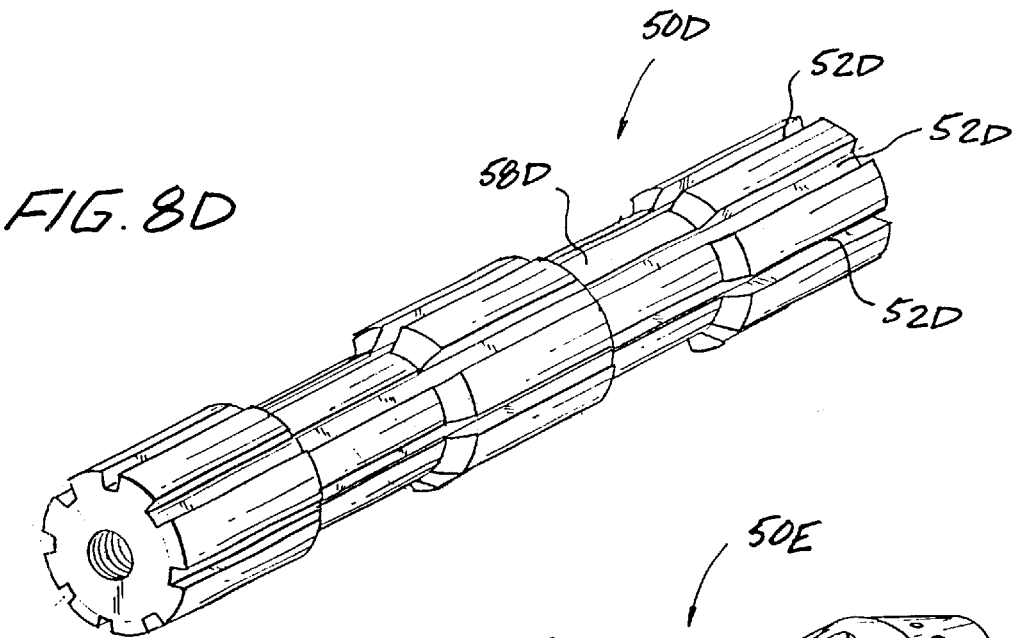
FIG. 8D is a side elevation of a fourth alternate embodiment of the FIG. 8 mandrel with flutes and elongated rings.
Figure 8E:
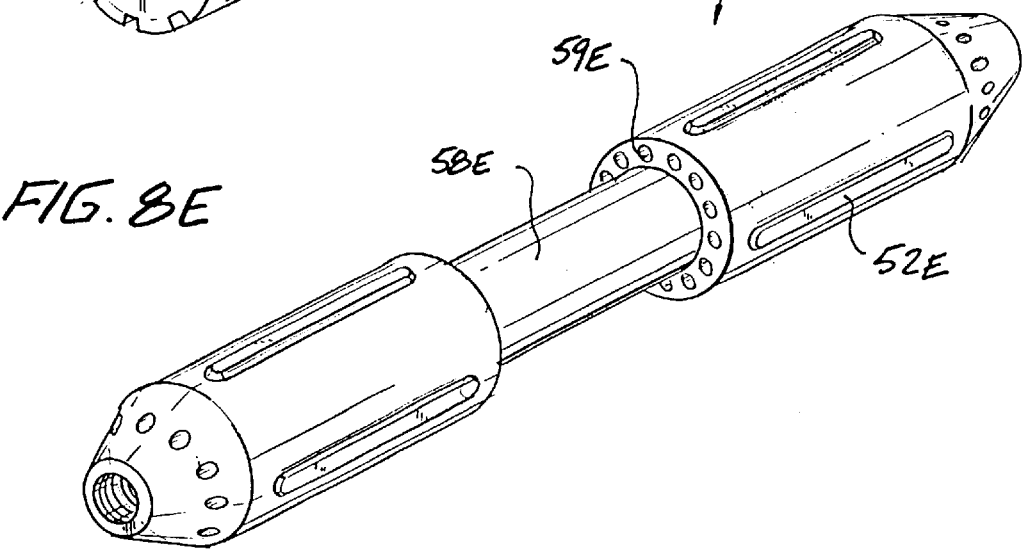
FIG. 8E is a side elevation of a fifth alternate embodiment of the FIG. 8 mandrel with partial flutes, elongated rings and holes.

In addition, FIGS. 8A–8F show alternative mandrel 50 embodiments which provide depressions 52 for providing adequate resin impregnation. FIG. 8A is an elevation of an alternate mandrel 50A with depressions 52A and a helices 56A. The addition of helices 56A helps to insure complete resin coverage of the braid 10 because as the braid 10 moves along the mandrel 50A, the entire length of the braid 10 will pass over the helices 56A depression, thereby encountering a section of the mandrel 50A which offers no resistance to resin flow. Similarly, FIG. 8B is an additional embodiment of the mandrel 50B that includes recessed ring sections 55B along the flutes 52B of the mandrel 50B. FIG. 8C. is an additional embodiment of the mandrel 50C with helices 56C and holes 57C. The helix section 56C has holes 57C that go completely through the mandrel 50C in order to promote cross mandrel circulation of the matrix resin. Another alternative embodiment is shown in FIG. 8D. The mandrel 50D includes flutes 52D and a tapered ring 58D. FIG. 8E is an additional embodiment of the mandrel that includes one depression 52E and wide, tapered ring 58E that is recessed in the center section of the mandrel 50E. Holes 59E are included on the leading end and trailing end of the mandrel 50 along its longitudinal axis.

FIGS. 8–8E illustrate a variety of geometric configurations of the depressions 52 on the mandrel 50 to enable resin to flow through the braid 10 and/or to contact with the braid's interior without resistance. As is apparent from these figures, our invention is not limited to any particular geometry. Any geometric configuration which provides one or more depressions on the surface 54 of the mandrel 50 will improve resin impregnation of the braid 10. In addition, while a helical orientation of depressions (e.g., helices 56A) assist in ensuring adequate impregnation, they are not required.

The braid 10 exiting from the chamber 18 is adequately impregnated with resin. Such braid 10 can also be the end product of an alternative process 2 (not shown) which produces an impregnated braid 10 which is not pultruded in such process 2. This end product, commonly referred to as a piece of pre-preg or pre-preg, can be produced by a braiding manufacturer for shipment to a third party which thereafter finishes the resin impregnated braid by pultruding it or performing another process on it. In addition, in further alternative embodiments of the present invention, the mandrel 50 for use in the resin injection chamber 18 can be used for materials other than pre-consolidated tubular braids 10. For example, the same mandrel 50 can be used in a resin bath or pressurized or non-pressurized resin injection chamber to improve resin impregnation for in-line braids as well as flat braids or other material containing fiber. Therefore, the use of a pre-consolidated tubular braid 10 does not limit the use of the mandrel 50 according to the present invention.

Referring to FIG. 9, there is shown a perspective view of the pultrusion die 32 with a shaping mandrel 35 and the braid 10 moving from the resin injection chamber 18 to the die 32. As the resin impregnated braid 10 exits the resin injection chamber 18, it can pass over an additional turnbuckle 17 (not shown). It then encases a shaping mandrel 35 (shown encased by the braid 10) prior to entering the pultrusion die 32. The shaping mandrel 35 can have a round shape, but additional embodiments can be any shape which meets the end product composite 11 design. Such alternative shapes are, for example, a square, a rectangle (as shown in FIG. 9) or a triangle etc. In one embodiment of the present invention, the mandrel 35 maintains a concentric orientation inside the pultrusion die 32 due to the turnbuckle 17 (shown in FIG. 1). The turnbuckle 17 functions in the same manner as the turnbuckle 16 to provide flexibility in the movement of the mandrel 35 along its radial axes within the die 32. As a result, the concentric orientation of the mandrel 35 is optimized. As discussed above, the placement of one or more turnbuckles depends on the type of mandrel used, as well as the type of braid and resin. In one embodiment, turnbuckles 16 and 17 are located on either side of the chamber 18. In alternative embodiments, according to the present invention, turnbuckle 17 is located adjacent to the die 32. In still further embodiments, only one turnbuckle, e.g., either 16 or 17, can be used to maintain the braid 10 in a concentric orientation or the turnbuckles 16 and 17 are unnecessary.

Inside the die 32, the braid 10 is heated to cure the resin. Upon exiting the die 32, the braid 10 is a composite 11. Whereas the braid 10 was rough, flexible, and soft, the cooled braid composite 11 is smooth, rigid, and hard. It is eminently suited to form various sizes of hockey sticks, poles, arrows and other sports equipment, as well as handles, pipes, support beams and the like. Pultrusion dies 32 are conventional in the braiding industry; such dies are commercially available from Creative Pultrusions (Alum Bank, Pa.).

Figure 10:
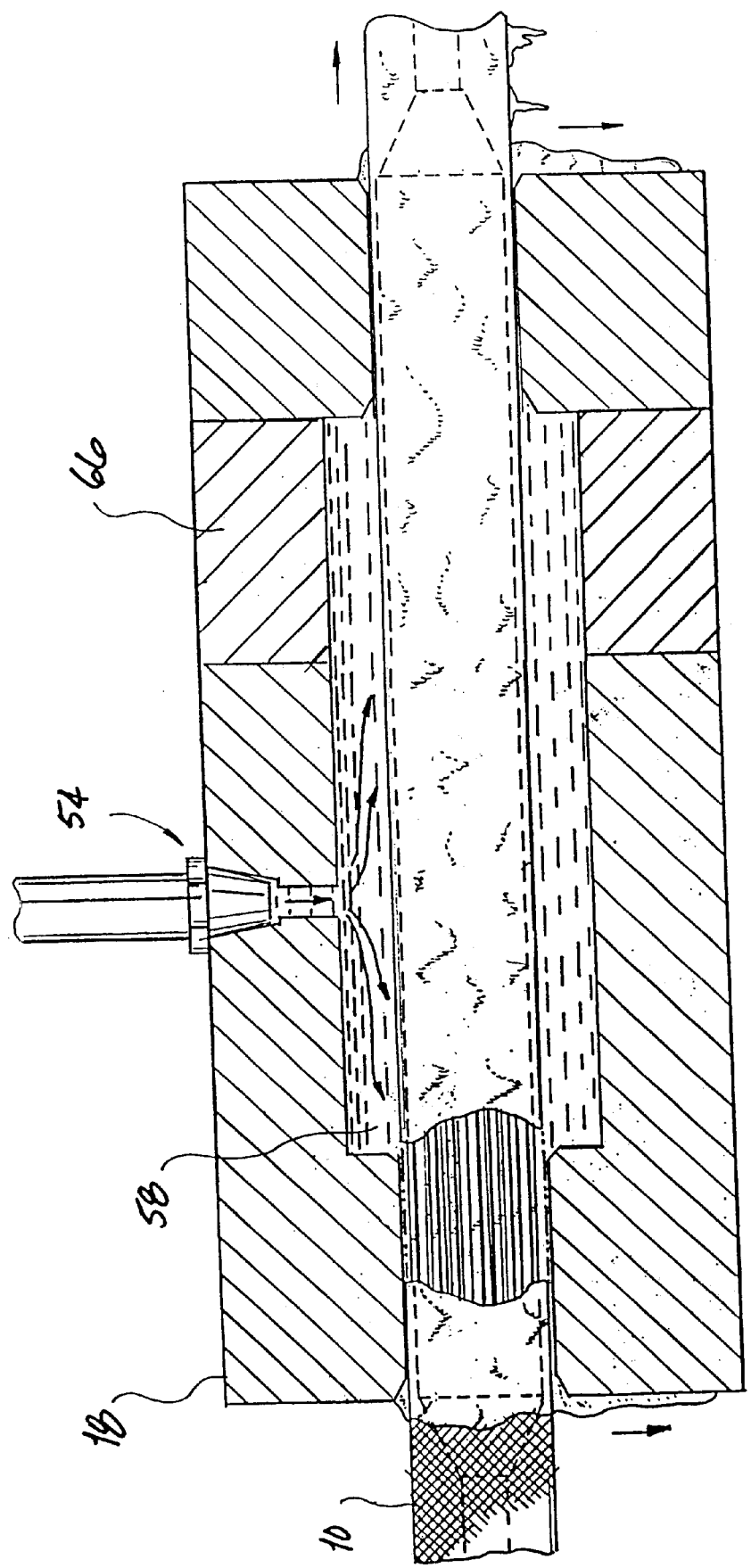
FIG. 10 is a side elevation sectional view of a resin injection chamber with a resin injection chamber extension according to an alternative embodiment of the present invention.

FIG. 10 illustrates a side elevation sectional view of an alternative embodiment of the resin injection chamber 18. This chamber 18 includes a resin injection chamber extension 66. The extension 66 creates additional coverage space in the reservoir 58 by increasing the length of the mandrel 50. As the braid 10 travels over the longer mandrel 50, it is given additional exposure to the resin. This embodiment can receive the resin via a fitting 54 mounted on top of the housing 57.

Figure 11A:
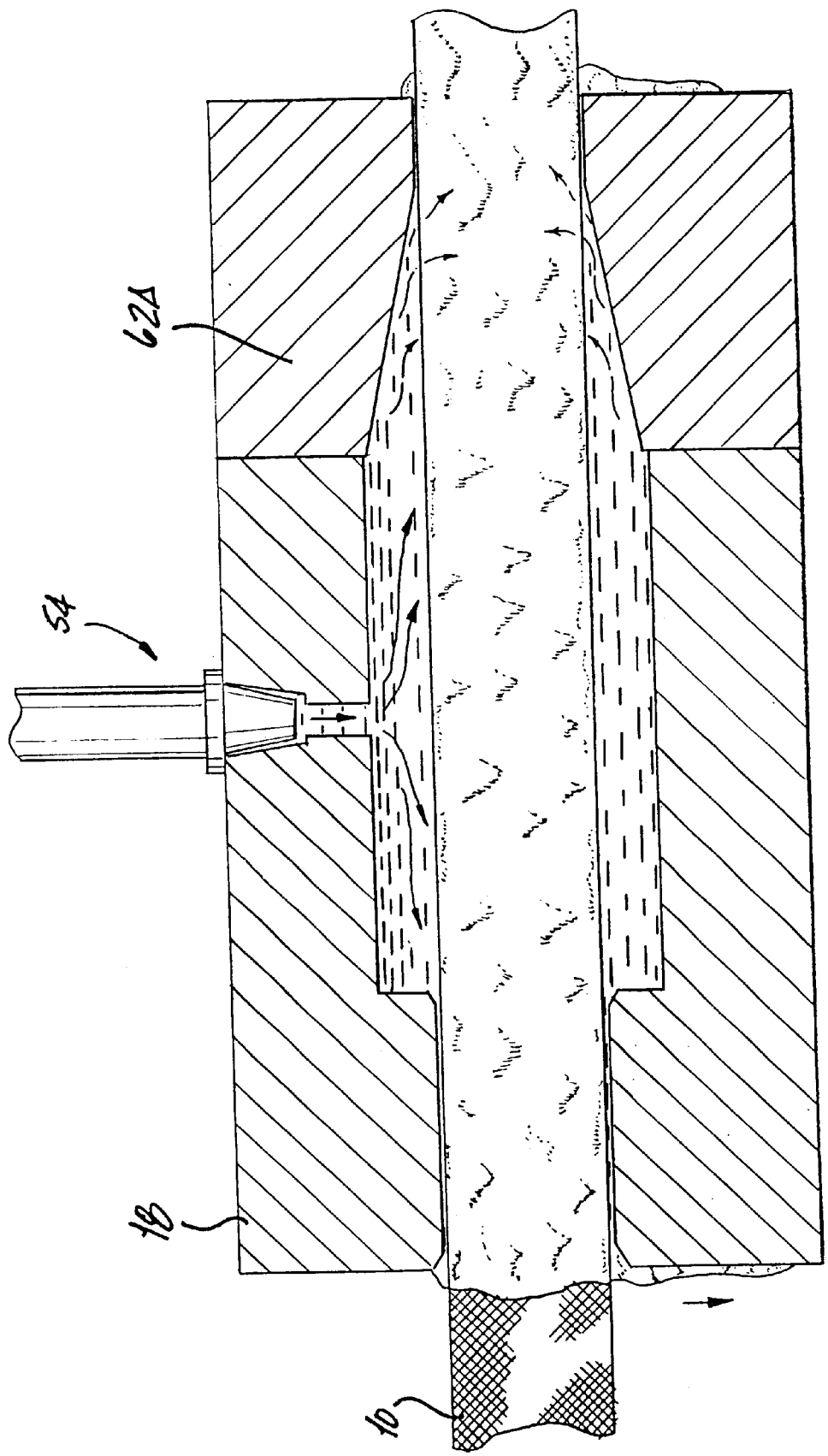
FIG. 11A is a side elevation sectional view of a resin injection chamber with an alternative embodiment of the geometry of the chamber reservoir.
Figure 11C:
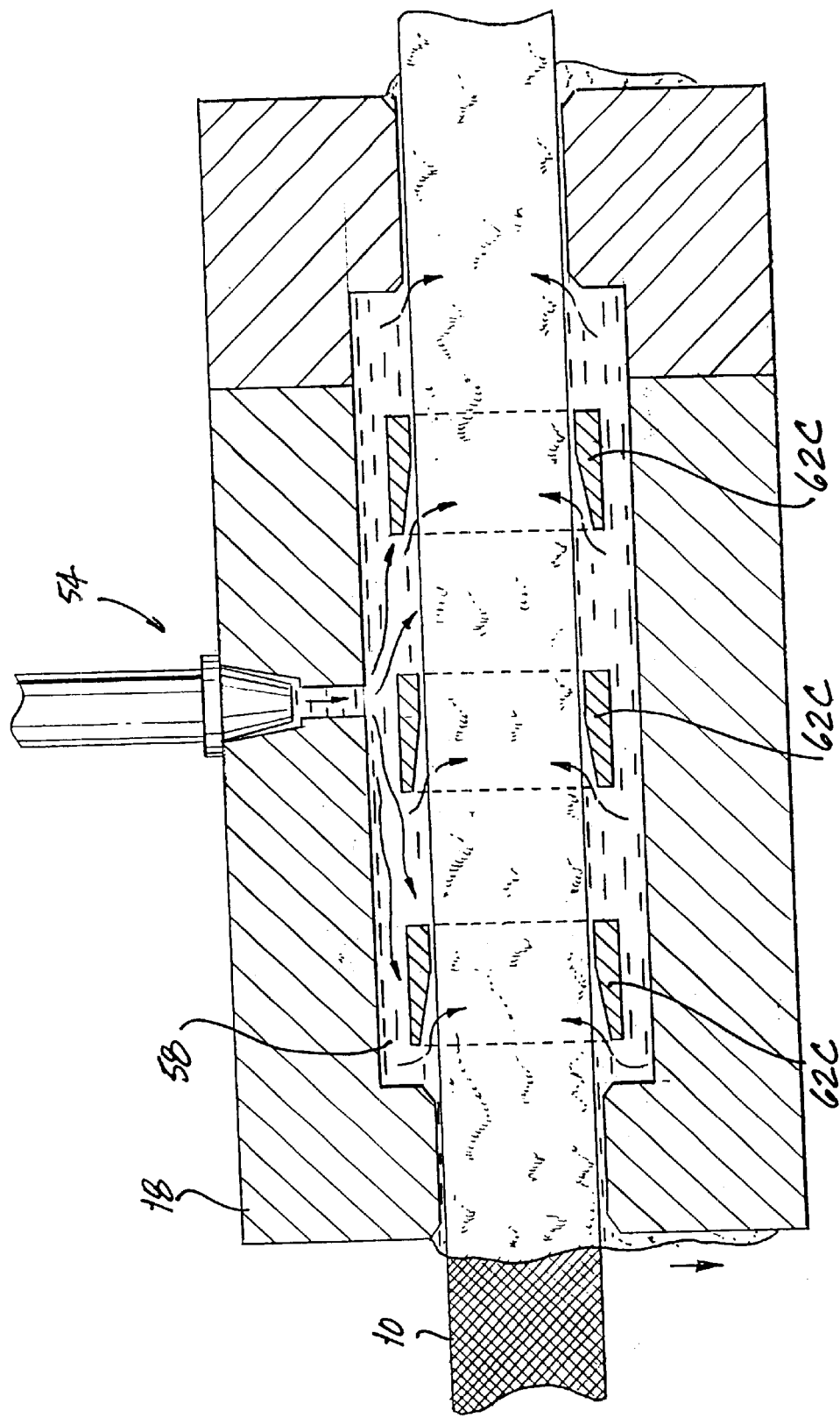
FIG. 11C is a side elevation sectional view of a resin injection chamber with an alternative embodiment of the reservoir including blocks adjacent to the mandrel portion inside the chamber.

FIGS. 11A–11C show side elevation sectional views of further alternative embodiments of the resin injection chamber 18 with additional components in the reservoir 58. In these embodiments, blocking components 62A, 62B and 62C are added within the chamber reservoir 58. The purpose of the blocking components 62A–62C is to limit the flow area of the resin around the braid 10 such that the resin is forced back into the braid. In addition, the shape of the blocking components 62A–62C acts as a barrier to the forward direction of resin flow resulting from the drag on the resin from the forward movement of the braid 10. Such blocking components 62A–62C can be used in combination with the mandrel 50 to improve the resin impregnation of the braid 10. For example, as shown in FIG. 11B, a depression 52BB in the mandrel 50 is positioned over a bulbous section of the blocking component 62B. This can further maximize resin flow around the depression.

Figure 12:
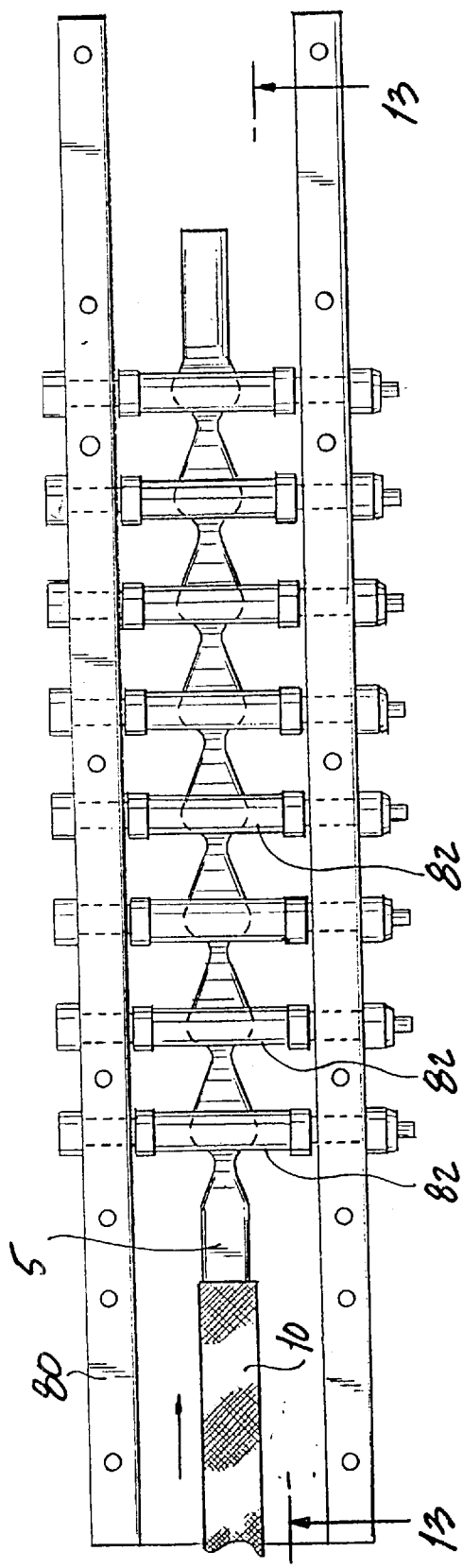
FIG. 12 is a top view of an alternative embodiment of a roller drive assembly according to the present invention.
Figure 13:
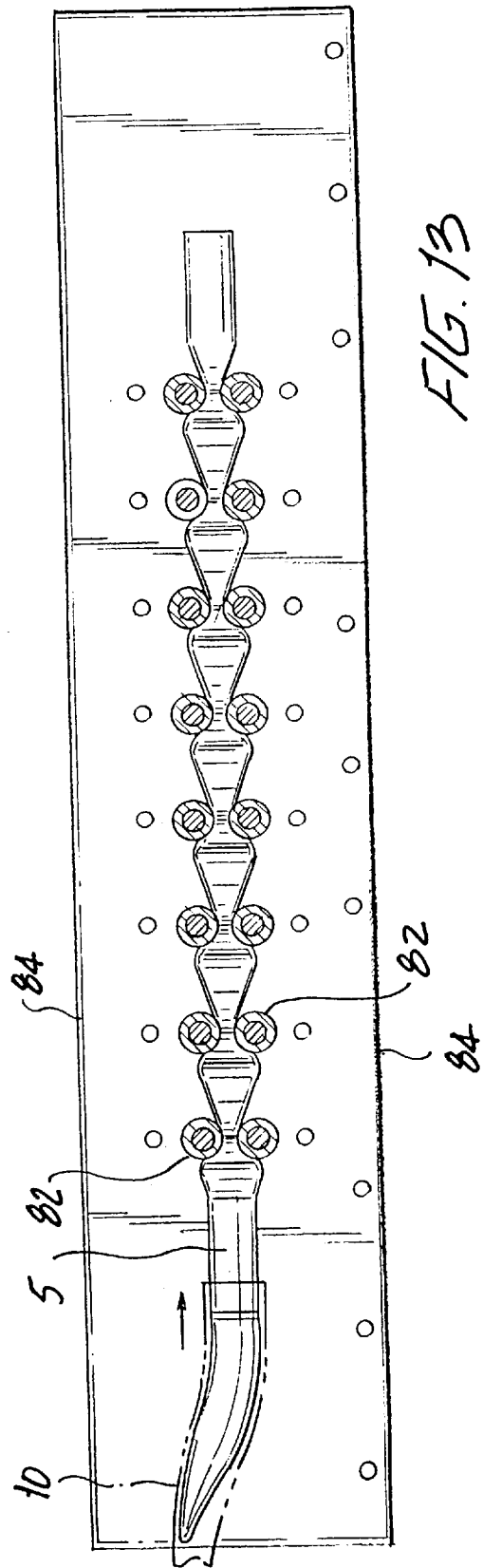
FIG. 13 is a side view along line 13—13 of the FIG. 12 roller drive assembly.

FIGS. 12 and 13 show alternative embodiments of mandrel 5 supported by assembly 80, including a series of smaller rollers 82. FIGS. 12 and 13 are a top view and a side view, respectively, of the alternative assembly 80. The mandrel 5 is floating in between the rollers 82, which serve the same function as the roller drive wheels 38. The number of roller pairs can be increased or decreased depending on the load on the mandrels. In addition, the mandrel shape is such that the perimeter is a constant at any cross section. Further, as shown in FIG. 12, the assembly 80 is closed on all sides of the mandrel, namely, the rollers 82 provide a top and a bottom and the walls 84 provide sides. As a result, the mandrel 5 is prevented from falling off the assembly 82. The shape of the mandrel shown in these FIGS. 12 and 13 holds the mandrel portions in the resin injection chamber and pultrusion die (not shown) stationary, to the extent possible, while the rollers 82 drive the braid. In alternative embodiments, the shape of the mandrel 5 can be modified, so long as it is supported by a pulling mechanism and can bear the load of the mandrel 5 and the pre-consolidated braid 10 as it moves along the pultrusion process 1.

In alternative embodiments according to the present invention, the mandrel 5 and roller drive assembly 12 can be any configuration which supports a non-bolted mandrel and the load from a pre-consolidated tubular braid 10. The load of the mandrel is dependent on a number of factors, such as the cross-section of the mandrels 5, 50 and 35, the chamber 18, the pultrusion die 32, the type of braid 10 (e.g., yarn thickness, braid density etc.) and resin (e.g., viscosity etc.) used. For example, for a circular mandrel 5 of approximately 1 inch in diameter with any permutation of cross-section for the mandrels and any type of braid and resin, we have determined that a theoretical load of up to about 2,000 lbs. optimally should be accommodated. However, loads can vary widely depending on the above-described factors. Therefore, the load on the mandrel 5 is dependent on the particular application and does not limit our invention.

Those skilled in the art will readily recognize numerous adaptations and modifications which can be made to the present invention and which will result in a pultrusion method and device for pre-consolidated tubular braids, yet all of which fall within the spirit and scope of the present invention as defined in the following claims. Accordingly, the invention is to be limited only by the scope of the following and their equivalent.

What is claimed:

1. A pultrusion process for producing a composite using a pre-consolidated tubular braid, the process comprising the steps of:

surrounding a mandrel with said pre-consolidated tubular braid;

providing an assembly supporting relative movement of said braid and said mandrel;

passing said braid through a resin injection chamber over an injection portion of said mandrel in said chamber, said chamber being connected to a resin source and said injection portion having a surface including at least one depression thereon;

applying resin within said chamber to flow through said braid and into said depression, thereby impregnating said braid with resin; and thereafter, passing said braid through a pultrusion die over a curing portion of said mandrel in said die, said die including a heating source, whereby said die heats said braid to form the composite.

2. A pultrusion process of claim 1 wherein said braid has an interior and said applying step comprises applying resin such that said resin contacts portions of the interior of said braid at said depression.

3. A pultrusion process of claim 1 wherein said braid has an interior and said applying step comprises applying resin such that said resin contacts the interior of said braid at said depression.

4. A pultrusion process for continuously producing a composite using a pre-consolidated tubular braid, the process comprising the steps of:

surrounding a mandrel with said pre-consolidated tubular braid;

providing an assembly supporting relative movement of said braid and said mandrel;

passing said braid through a resin injection chamber over an injection portion of said mandrel in said chamber, said chamber being connected to a resin source and said injection portion having a surface including at least one depression thereon;

applying resin within said chamber to flow through said braid and into said depression, thereby impregnating said braid with resin; and thereafter, passing said braid through a pultrusion die over a curing portion of said mandrel in said die, said die including a heating source, whereby said die heats said braid to form the composite.

5. A pultrusion process of claim 4, wherein said step of surrounding a mandrel comprises surrounding a first end of a mandrel with said pre-consolidated tubular braid, said process further comprising the step of removing the formed composite from a second end of said mandrel.

6. A pultrusion process of claim 1, wherein said step of surrounding a mandrel comprises surrounding a first end of a mandrel with said pre-consolidated tubular braid, said process further comprising the step of removing the formed composite from a second end of said mandrel.

* * * * *